Feb. 15, 1966    SHU LEE    3,235,204
MISSILE ATTITUDE CONTROLLER
Filed Nov. 7, 1960    2 Sheets-Sheet 1
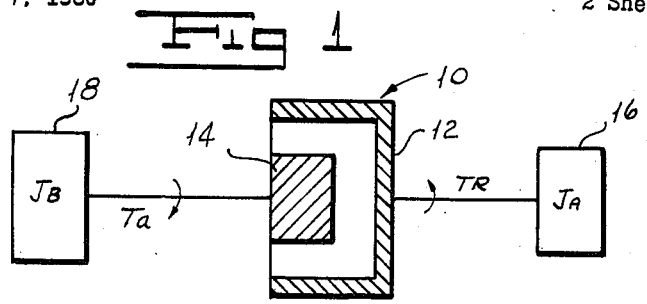
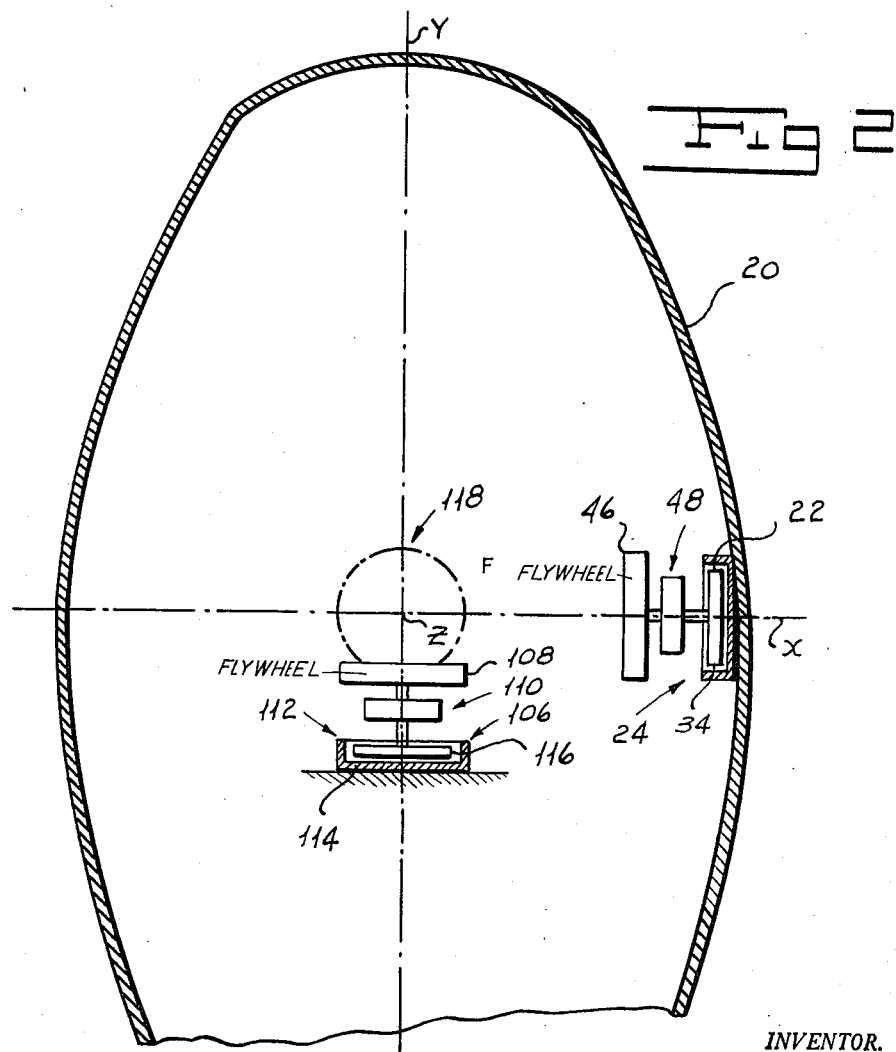
INVENTOR.
SHU LEE
BY
ATTORNEY

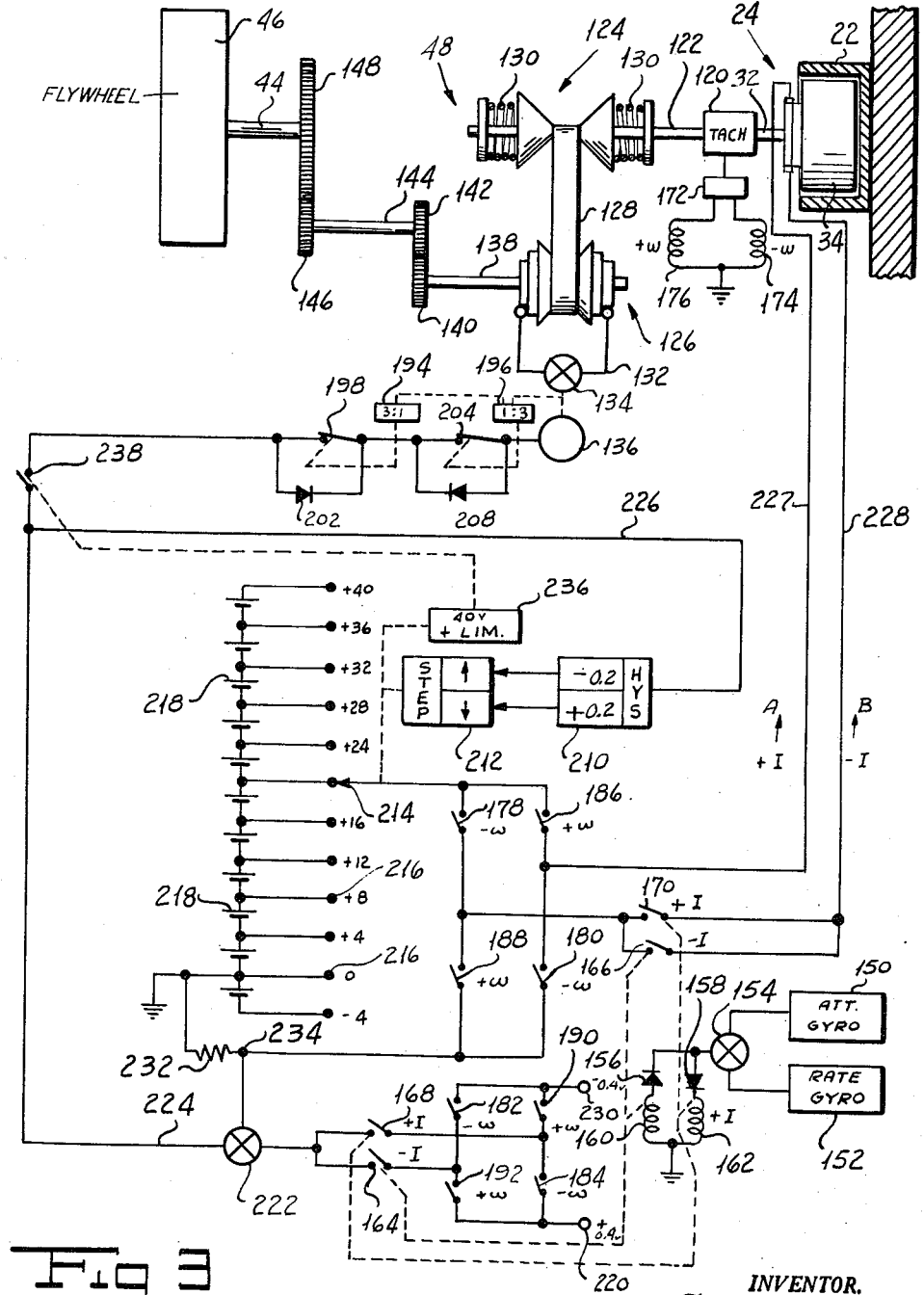

UNITED STATES PATENT OFFICE 3,235,204
Patented Feb. 15, 1966

3,235,204
MISSILE ATTITUDE CONTROLLER
Shu Lee, Scarsdale, N.Y., assignor to United Aircraft Corporation, East Hartford, Conn., a corporation of Delaware
Filed Nov. 7, 1960, Ser. No. 67,548
8 Claims. (Cl. 244—14)

My invention relates to a missile attitude controller and more particularly to an improved system for changing the attitude of a missile or space vehicle in flight through space where sufficient aerodynamic force to produce the required control is not available.

It is necessary to control the attitude of a missile or of a space vehicle in flight for various reasons. For example, when a missile or space vehicle is preparing to re-enter the atmosphere of a planet its attitude must be controlled to establish the proper re-entry angle. This is done not only for the purpose of reducing heating resulting from friction with the atmosphere but also, in the case of a space vehicle, to obtain the proper orientation of the vehicle for landing. When photographs of the earth or some other body are to be taken from a space vehicle in flight the attitude of the vehicle must be controlled to orient the camera with reference to the object being photographed.

Aerodynamic forces in space either do not exist or are so small as not to be useful. For this reason control surfaces cannot be used to control the attitude of a missile or space vehicle in its flight through space.

Various systems for controlling the attitude of a missile or space vehicle in flight through space have been proposed. One widely used system relies on the reaction torque resulting from the ejection of gas through a pair of gas nozzles to control attitude. In this system the nozzles of the pair are mounted externally of the missile or space vehicle at locations symmetrically disposed with respect to the axis about which the attitude of the of the missile or vehicle is to be controlled. When gas is ejected from the nozzles, it produces a couple tending to rotate the vehicle about the control axis. This system embodies a number of disadvantages. Inherent in the system is the requirement that gas be expelled from the nozzles continuously throughout the control period. As a result of this requirement, a large amount of gas occupying a considerable amount of valuable space must be carried by the vehicle. Owing to the fact that gas is being expelled from the nozzles during the flight to provide the required control, the weight and inertia of the missile at the end of the control period are quite different from the initial weight and inertia. In this manner boundary conditions for the missile dynamics are created thus making the design of the control system extremely difficult.

As has been explained hereinabove, the gas ejection attitude control system requires that holes or nozzles or some other external mechanical configuration must be installed on the outer surfaces of the missile. The resulting "unclean" surface produces heating and drag while the missile is still in the earth's atmosphere and when the missile is entering an atmosphere. Owing to the fact that gas is sensitive to temperature changes, the reaction torque of the system varies widely as the missile temperature varies. The use of the gas ejection method to control missile attitude requires that a pneumatic system be provided in addition to the existing electrical system in the missile.

It has also been proposed in the prior art to use multiple axis gyroscopic systems for producing torques to control vehicle attitude. These systems have the defect that they require the application of correcting torques about axes other than that around which the control is to be generated. Friction and windage in these systems result in a constant drain on the source of power, such as a battery.

Another system for controlling attitude which has been suggested in the prior art incorporates a pair of constantly oppositely rotating masses which may be coupled by brakes to the craft to produce the required control action. In this system there not only is a constant drain on the source of power, but also there is large dissipation of power in the braking action.

I have invented a missile attitude controller which overcomes the disadvantages of control systems of the prior art pointed out hereinabove. My attitude controller does not require the loss of any material during the control period with the result that the weight and inertia of the missile at the end of the control period are substantially the same as the initial weight and inertia of the missile. Since my system does not rely on a loss of material, such as gas through nozzles for its operation, it does not require any storage space. My missile attitude controller requires no connections to the outer surface of the missile or space vehicle. My controller is relatively insensitive to temperature change as compared with control systems of the prior art. My system has the advantage that there is no power drain in free flight of the missile or the like. No correcting torques such as are necessary in the gyroscopic systems of the prior art are required in my system. My system embodies a unique arrangement by which some of the energy drained from the power source is restored by dynamic braking action when the system slows. My controller operates electrically with the result that the already existing electrical system of the missile or space vehicle may be used to energize my control.

One object of my invention is to provide an improved missile attitude controller for controlling the attitude of a missile or of a space vehicle in flight through regions where aerodynamic forces are not available.

Another object of my invention is to provide a missile attitude controller which requires substantially less space than that required by controllers of the prior art.

A further object of my invention is to provide a missile attitude controller in which the weight and inertia of the missile as it nears the end of the control period are substantially the same as the initial weight and inertia of the missile.

Still another object of my invention is to provide a missile attitude controller which requires no connections to external surface of the missile or space vehicle being controlled.

A still further object of my invention is to provide a missile attitude controller which is relatively insensitive to changes in temperature.

Yet another object of my invention is to provide a missile attitude controller which is powered by the already existing system of the missile.

Still another object of my invention is to provide a missile attitude controller in which there is no power drain when the missile is in free flight.

A still further object of my invention is to provide a missile attitude controller which requires no correcting torque about axes other than the control axis.

Yet another object of my invention is to provide a missile attitude controller in which some of the energy taken from the source of power is restored by dynamic braking action.

Other and further objects of my invention will appear from the following description.

In general my invention contemplates the provision of a missile attitude controller comprising a motor the stator of which is fixed to the frame of the missile and the rotor of which is supported for rotation about a control axis of the missile. A variable speed transmission couples a flywheel to the rotor of the motor. In response to a displacement of the missile about its control axis, I energize the motor to produce a reaction torque which causes the missile to move about its control axis to return to that position from which it deviated. In the course of the control operation I operate the motor and variable speed transmission in such manner as to provide the required control in as short a period of time as is possible within practical limits imposed by the elements of my system. I also take advantage of dynamic braking action as the system returns to restore power to the system.

In the accompanying drawings which form part of the instant specification and which are to be read in conjunction therewith and in which like reference characters identify like parts in the various views:

FIGURE 1 is a schematic view of a motor and its associated inertias illustrating the principle underlying my missile attitude controller.

FIGURE 2 is a schematic view of a missile or space vehicle having my missile attitude controller for controlling the attitude of the missile or space vehicle with respect to its various control axes.

FIGURE 3 is a schematic view illustrating the details of my missile attitude controller with respect to one control axis of a missile or space vehicle.

Referring now to FIGURE 1 of the drawings, I have shown a motor indicated generally by the reference character 10 having a stator 12 and a rotor 14. A mass 16 having a moment of inertia $J_A$ is attached to stator 12 for rotation therewith. A mass 18 having a moment of inertia $J_B$ is attached to rotor 14 for movement therewith. For purposes of explanation I will assume that the mass 16 producing the moment of inertia $J_A$ includes the mass of the stator 12 and that the mass 18 producing the moment of inertia $J_B$ includes the mass of the rotor 14. When the motor 10 is energized in a manner known to the art, the stator 12 exerts an action torque $T_a$ to the rotor and the rotor 14 will exert a reaction torque $T_R$ to the stator. I have ilustrated the directions of these torques by the arrows shown in FIGURE 1. It will be obvious that $T_a = -T_R$, meaning that the action torque $T_a$ and the reaction torque $T_R$ are equal in magnitude but opposite in direction.

As is known in the art, if the stator 12 is fixed in space upon energization of the motor 10, the mass 18 accelerates in space at a rate of $T_a/J_B$. Conversely with the rotor 14 fixed in space and with the stator 12 free to move the mass 16 accelerates in space at the rate of $T_R/J_A$. With neither of the two masses 16 and 18 fixed in space, they accelerate in opposite directions at respective rates of $T_R/J_A$ and $T_a/J_B$. Since the action torque and the reaction torque are equal in magnitude, the relative acceleration rates are determised by the relative magnitudes of the masses. From the foregoing it will be seen that if the mass 18 applied to the rotor is infinite, the rotor will remain fixed in space and the full stalled torque of motor 10 will be applied to the stator to accelerate the mass 16 in space. When the stator reaches full speed with the rotor fixed, the torque is a very small value. However, at this time the stator has received the full benefit of the motor from the high stalled torque condition.

Refering now to FIGURE 2, I have shown a control system which operates to perform the required control action in a relatively short period of time which is consistent with practical considerations. In this arrangement to control the missile air frame 20 about its pitch or X axis in FIGURE 2, I secure the stator 22 of a motor, indicated generally by the reference character 24 to the frame 20 for movement therewith. I couple the motor rotor 34 to a flywheel 46 through a variable speed transmission 48. It will be apparent that, in order to charge the angular momentum of the missile around its pitch axis X, I must change the angular momentum of the flywheel 46. It will be clear also that the momentum of the flywheel 46 is a function of its mass and that time of response of the system depends on available motor power.

It is desirable that as small a flywheel be used as is consistent with the angular momentum required to produce the control action. It can readily be demonstrated that the transmission 48 permits me to use a flywheel 46 of practicable size and yet accomplish the object of my invention. Referring now to FIGURE 3, I have shown a specific embodiment of the pitch contol system shown in FIGURE 2. The shaft 32 of motor 24 is coupled by a tachometer 120 to the input shaft 122 of a first split pulley assembly, indicated generally by the reference character 124 of a variable speed drive 48 including a second split pulley assembly, indicated generally by the reference character 126 connected to the assembly 124 by a belt 128. As is known in the art, the halves of the pulley system 124 are normally urged together by springs 130. Positionable means 132 under the control of a differential 134 actuated by an electromagnetic element 136 is adapted to vary the spacing between the halves of the pulley system 126 to determine the speed ratio of the variable speed drive system. The pulley assembly 126 drives an output shaft 138 carrying a gear 140 which meshes with a gear 142 carried by a shaft 144 carrying a gear 146 which drives a gear 148 on the shaft 44 of the flywheel 46. By way of example let us assume that the rated motor speed is at 40 volts with no load so that we get maximum generator action for speeds 10% greater at which the E.M.F. is 44 volts and we get maximum motor action at speeds 10% less where the E.M.F. is 36 volts. Assume also that rated motor current flows when the back E.M.F. differs from battery voltage by 4 volts.

The control system shown in FIGURE 3 includes an attitude gyro system 150 and a rate gyro system 152 which apply their output signals to a differential 154. Respective oppositely biased diodes 156 and 158 couple the differential 154 to windings 160 and 162. When energized winding 160 closes normally open switches 164 and 166. Winding 162, when energized, closes normally open switches 168 and 170.

Tachometer 120 produces an output signal which, in one direction of rotation of shaft 32 actuates a flip flop 172 to energize a winding 174 and which, in the other direction of rotation actuates flip flop 172 to energize a winding 176. When energized, winding 174 closes normally open switches 178, 180, 182, and 184. Winding 176, when energized, closes normally open switches 186, 188, 190, and 192.

Respective switch actuators 194 and 196 are responsive to the differential 134 at the limits of speed change provided by the speed change mechanism. For example, the variable speed drive system may be arranged to provide speed ratios in the range of from 1 to 3 step-up to 3 to 1 step-down. When the 3 to 1 limit is reached, actuator 194 opens a normally closed switch 198 in parallel with a diode 202. When the 1 to 3 limit is reached, actuator 196 opens a normally closed switch 204 in parallel with a diode 208.

A dead band or hysterisis circuit 210 is adapted to produce signals on its respective output channels in response to respective input signals of a predetermined magnitude and of opposite polarity to cause a stepping switch 212 to move a brush 214 up or down through one step from one of a number of contacts 216 to an adjacent contact 216. The contacts 216 are connected respectively to common terminals of a plurality of series-connected batteries 218. I provide batteries 218 of a potential and connect one of the contacts 216 to ground so as to cause the respective contacts 216 from bottom to top as viewed in FIGURE 3 to correspond to respective potentials, for example, of from −4 volts to +40 volts in four volt intervals.

I connect the normally open switches 182 and 184 responsive to energization of winding 174 respectively between a terminal 230 of a suitable source of negative control voltage such as −0.4 v. and one terminal of switch 164 and between a terminal 220 of a suitable source of positive control voltage such as +0.4 v. and one terminal of switch 168. I connect the normally open switches 190 and 192 respectively between terminal 230 and switch 168 and between terminal 220 and switch 164. Switches 164 and 168 are connected to one input of a summer 222 the other input of which is supplied from a terminal 234 of a resistor 232 connected between ground and the common terminal of switches 180 and 188 to provide a measure of motor current. Conductors 224 and 226 apply the output of summer 222 to the input of the hysterisis circuit 210. A normally open switch 238 actuated by a 40 v. limit 236 responsive to the position of arm 214 couples the output of summer 222 to the servomotor 136 through circuit including switches 198 and 204 and diodes 202 and 208. Conductors 227 and 228 respectively connect one brush of motor 24 to the common terminal of switches 180 and 186 and connect the other motor brush to one terminal of each of switches 166 and 170, the other terminals of which are connected to the common terminal of switches 178 and 188. I so select the value of measuring resistor 232 as to provide 0.4 drop across the resistor when rated motor current flows.

In order to explain the operation of the system shown in FIGURE 3, assume that shaft 122 is barely rotating in a direction which may be considered to be negative so that winding 174 is energized to close switches 178, 180, 182, and 184. Assume also that brush 214 engages the plus four volt contact 216 and that the variable speed drive is adjacent to the 1 to 3 limit. As will be evident from the description given hereinafter, these are the conditions which exist at the end of a control operation. Under these conditions assume that the command from the differential 154 is of such polarity as to energize winding 162 to close switches 168 and 170. When this occurs the output of the summer 222 will be positive to cause stepper 212 to move arm 214 down through two steps to the −4 v. contact 216. With this connection full rated current flows through the motor armature in the direction of the arrow A. Under the action of this current the direction of motor rotation reverses and the winding 174 de-energizes and winding 176 energizes to close switches 186, 188, 190, and 192. This causes a negative potential from terminal 230 to be applied through switches 190 and 168 and through summer 222 and conductors 224 and 226 to circuit 210 to cause stepping switch 212 to move brush 214 first to zero voltage contact 216 and then to the +4 volts contact 216.

With full rated motor current applied to the motor 24 in the direction of the arrow A in FIGURE 3, the motor begins to accelerate. Upon acceleration under the assumed conditions outlined above when the motor E.M.F. rises to 2 volts the motor current drops to 50% of the maximum and the terminal 234 of resistor 232 becomes less positive. Since the output of the summer 222 is still negative, circuit 210 causes the switch 212 to move brush 214 up into engagement with the +8 volts contact 216 and the motor current increases to 150% of rated motor current. This action continues until the brush 214 engages the +36 volts contact 216. In this position of the brush when the back E.M.F. is 34 volts then the brush 214 moves into engagement with the +40 volts contact 216. At this point the +40 volts limiter 236 operates to close a normally open switch 238. At this time the magnitude of the positive potential at point 234 is greater than that of the negative potential at the other input of the summer so as to cause motor 136 to drive the speed change 48 to the 1 to 3 limit. It will be remembered that at the outset the speed change was adjacent this limit. When the motor speed is maximum, the 1 to 3 ratio limiter 196 operates to open switch 204 with the result that the diode or crystal 208 blocks the positive output signal of summer 222.

At the time at which the motor speed builds up to a point where its back E.M.F. is 36 volts then the output of summer 222 is zero and full current flows to the motor armature. If the speed of the motor 24 increases, then the current drops below full rated current and the potential at the output terminal of the summer 222 becomes negative. When this occurs, current flows through the crystal or diode 208 and switch 198 to the servo motor 136 to move the variable speed drive 48 away from the 1 to 3 limit and toward the 3 to 1 limit until the speed of the motor 24 decreases to a point at which the back E.M.F. has a value which causes the output of summer 222 to be zero. Switch 204 closes and the drive ratio moves toward the 3 to 1 limit gradually until the optimum conditions are reached. When the 3 to 1 limit is reached switch 198 opens to prevent a negative signal from energizing motor 136. Under these conditions of rated current at maximum speed with a 3 to 1 speed change the flywheel 46 builds up to speed and the missile or the like is caused to move about the control axis to the desired position.

The operation of the rate gyroscope 152 is such that it anticipates the final attitude and functions to slow down the system by energizing the winding 160 to close switches 166 and 164. When this occurs, the potential applied to the summer 222 through the switch 164 is positive. This positive potential drives the speed changing system from the 3 to 1 limit toward the 1 to 3 ratio limit. The speed of the motor 24 increases until the back E.M.F. is 44 volts and the point 234 becomes negative and the current flow in the direction of the arrow B in FIGURE 3 resulting from generator action is 100%. Under this condition dynamic braking causes the motor 24 to slow down and thus reduces the back E.M.F. While this is true, the output potential of the summer 222 drives the variable speed drive to raise the speed and to maintain the rated generator speed of 10% above no load speed. When the variable speed drive reaches the 1 to 3 limit switch actuator 196, switch 204 opens. When this occurs, the positive output of the summer 222 is broken. When this positive output of the summer 222 is +0.2, as when the back E.M.F. is 42 volts, then switch 212 moves brush 214 to the 36 volt contact 216 and increases the current to 150% of rated current. When this occurs, the output signal from the summer 222 becomes negative. This potential will not, however, move the servo motor 136 away from the 1 to 3 limit 196 since switch 238 is open when the stepping switch 212 is not actuating the limiter 236 as it does in the position of the brush 214 in which it engages the 40 volt contact 216. In this manner the stepping switch 212 acts to maintain the generator action current in the direction of the arrow B in FIGURE 3 at a value between 50% and 150% of rated current.

When the E.M.F. is 6 volts, the switch 212 moves arm 214 from the +4 volt contact 216 to the zero volt contact 216. When the E.M.F. is +2 volts, brush 214 moves from the zero volt contact 216 to the −4 volt contact 216. When the speed is zero so that the E.M.F. is zero, then the flip flop 172 is in its condition at which winding 174 is energized. This action reverses the motor connections and causes the potential applied to the summer 222 to become negative. This potential becomes the output of the summer and moves the brush 214 two steps upward to the +4 contact 216 at which position the current in the direction of arrow B is 100%. If now the output of summer 154 is zero, we return to the initial conditions at which the shaft 122 is barely moving in the negative direction so that winding 174 is energized, and the drive 48 is adjacent the 1 to 3 limit.

The action described above continues until the output signal of summer 154 is zero at which time neither winding 160 nor winding 162 is energized and the motor armature is open circuited.

The operation of my missile attitude controller will readily be apparent from the description given above. When, for example, the craft or missile 20 is displaced about its pitch axis motor 24 is energized to cause a torque to be applied to the missile to return it to the position from which it deviated. In the course of this control operation the variable speed drive is operated in such manner as to cause the control action to take place in as short a period of time as is consistent with the practical limits of the system. As the desired orientation is approached the system slows down and dynamic braking restores some energy to the battery system. The arrangements associated with the other axes of my system function in a manner similar to that associated with the pitch axis.

It will be seen that I have accomplished the objects of my invention. I have provided a missile attitude controller which occupies a relatively small space as compared with systems of the prior art. My system permits the attitude of the missile to be controlled without affecting the weight and the inertia of the missile from the beginning to the end of the control period. My controller does not necessitate a connection through the missile wall to present an unclean surface. My controller is not sensitive to temperature change. It takes advantage of the already installed electrical system of the missile or space vehicle.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. In an attitude control system for a craft having a control axis apparatus including a motor having a stator and having a rotor and adapted to be energized to produce a reaction torque between said rotor and said stator, means mounting said stator on said craft for movement therewith, means mounting said rotor on said craft for relative rotary movement of said rotor with respect to said stator, a flywheel, means mounting said flywheel on said craft for movement about said control axis, a speed change device coupling said flywheel to said rotor, and means responsive to displacement of said craft about said control axis for energizing said motor and for actuating said speed change device to cause said craft to move about said control axis in a direction opposite to the direction of displacement.

2. In an attitude control system for a craft having a control axis apparatus including a motor having a stator and having a rotor and adapted to be energized to produce a reaction torque between said rotor and said stator, means mounting said stator on said craft for movement therewith, means mounting said rotor on said craft for relative movement of said rotor with respect to said stator, a flywheel, means mounting said flywheel on said craft for movement about said control axis, a variable speed transmission coupling said flywheel to said rotor and means responsive to displacement of said craft about said control axis for energizing said motor and for actuating said transmission to cause said craft to move about said control axis in a direction opposite to the direction of displacement.

3. An attitude control system for a craft having respective roll and pitch and yaw control axes including in combination respective roll and pitch and yaw controls each of which comprises a motor having a stator and a rotor and each of said motors adapted to be energized to produce respective reaction torques between respective stators and rotors, means mounting each stator on said craft for movement therewith, means mounting each rotor on said craft for relative movement with respect to its respective stator, a flywheel for each control axis, means mounting each flywheel for movement about its associated control axis, respective speed change devices connecting said flywheels to said rotors and respective means responsive to deviations of said craft about said control axes for energizing the motors of the respective controls and for actuating said speed change device to orient said craft with respect to its control axes.

4. In an attitude control system for a craft having a control axis apparatus including a motor having a stator and a rotor and adapted to be energized to produce a reaction torque between the rotor and stator, means mounting said stator on said craft for movement therewith, means mounting said rotor on said craft for relative movement with respect to said stator, a flywheel, means mounting said flywheel on said craft for rotation about said control axis, a variable speed drive coupling said flywheel to said rotor, and means responsive to displacement of said craft about its control axis for energizing said motor and for actuating said variable speed drive to provide a step up speed change ratio from said rotor to said flywheel.

5. In an attitude control system for a craft having a control axis apparatus including a motor having a stator and a rotor and adapted to be energized to produce a reaction torque between the rotor and stator, means mounting said stator on said craft for movement therewith, means mounting said rotor on said craft for relative movement with respect to said stator, a flywheel, means mounting said flywheel on said craft for rotation about said control axis, a variable speed drive coupling said flywheel to said rotor, means responsive to displacement of said craft about its control axis for energizing said motor and for actuating said variable speed drive to provide a step-up speed change ratio, and means responsive to operation of said motor to change said step-up speed change ratio to a step-down speed change ratio.

6. In an attitude control system for a craft having a control axis apparatus including a motor having a stator and a rotor and adapted to be energized to produce a reaction torque between the rotor and stator, means mounting said stator on said craft for movement therewith, means mounting said rotor on said craft for relative movement with respect to said stator, a flywheel, means mounting said flywheel on said craft for rotation about said control axis, a variable speed drive coupling said flywheel to said rotor, means responsive to displacement of said craft about its control axis for energizing said motor and for actuating said variable speed drive to provide a step-up speed change ratio from said rotor to said flywheel and means responsive to operation of said motor for actuating said variable speed drive to change said step-up speed change ratio to a step-down speed change ratio, means for anticipating the return of said craft to the condition from which it was displaced and means responsive to said anticipating means for actuating said variable speed drive to return to said step up speed change ratio.

7. In an attitude control system for a craft having a control axis apparatus including a motor having a stator and a rotor adapted to be energized to produce a reaction torque between the rotor and the stator, means mounting said stator on said craft for movement therewith, means mounting said rotor on said craft for relative rotation with respect to said stator, a source of electrical energy, a flywheel, means mounting said flywheel on said craft for rotary movement about said control axis, a speed change system coupling said flywheel to said rotor, means responsive to displacement of said craft about said control axis for supplying electrical energy from said source to said motor and means responsive to the approach of said craft to the position from which it was displaced for returning electrical energy to said source.

8. In an attitude control system for a craft apparatus including a motor having a rotor adapted to be energized to produce a reaction torque between said rotor and said stator, means mounting said stator on said craft for movement therewith, means mounting said rotor on said craft for rotary movement with respect to said stator, a flywheel, means mounting said flywheel for rotary movement of said craft, a variable speed transmission coupling said flywheel to said rotor, a source of variable voltage, switching means adapted to be actuated selectively to couple a relatively high voltage from said source to said motor and a relatively low voltage from said source to said motor, and means responsive to the speed of said motor for actuating said switching means to couple said low voltage to said motor at a low motor speed and to couple a relatively high voltage from said source to said motor at a relatively high speed.

References Cited by the Examiner

UNITED STATES PATENTS

| | | | |
|---|---|---|---|
| 2,803,151 | 8/1957 | Clerk | 74—739 X |
| 2,973,162 | 2/1961 | Haeussermann | 244—14 X |
| 3,048,108 | 8/1962 | Roberson et al. | 102—50 |

OTHER REFERENCES

Navigation: "Attitude Control Techniques," vol. 6, No. 1, Spring 1958.

BENJAMIN A. BORCHELT, *Primary Examiner.*

SAMUEL FEINBERG, CHESTER L. JUSTUS,
*Examiners.*